United States Patent
Hsu

(10) Patent No.: US 8,982,780 B2
(45) Date of Patent: Mar. 17, 2015

(54) METHOD AND APPARATUS FOR IMPROVING UPLINK TRANSMISSION IN A WIRELESS COMMUNICATION SYSTEM

(75) Inventor: Chia-Chun Hsu, Taoyuan County (TW)

(73) Assignee: HTC Corporation, Taoyuan District, Taoyuan (TW)

( * ) Notice: Subject to any disclaimer, the term of this patent is extended or adjusted under 35 U.S.C. 154(b) by 891 days.

(21) Appl. No.: 12/611,933

(22) Filed: Nov. 4, 2009

(65) Prior Publication Data

US 2010/0115355 A1    May 6, 2010

Related U.S. Application Data

(60) Provisional application No. 61/110,990, filed on Nov. 4, 2008.

(51) Int. Cl.
*H04W 4/00* (2009.01)
*H04J 3/18* (2006.06)
*H04W 72/12* (2009.01)

(52) U.S. Cl.
CPC ...... *H04W 72/1284* (2013.01); *H04W 72/1242* (2013.01)
USPC .......... 370/328; 370/477; 455/422.1

(58) Field of Classification Search
None
See application file for complete search history.

(56) References Cited

U.S. PATENT DOCUMENTS

| | | | |
|---|---|---|---|
| 8,040,793 B2* | 10/2011 | Gao et al. | 370/218 |
| 8,214,823 B2* | 7/2012 | Tsuchiya et al. | 717/171 |
| 2004/0192345 A1 | 9/2004 | Osborn | |
| 2005/0144225 A1 | 6/2005 | Anderson | |
| 2007/0121667 A1* | 5/2007 | Hare et al. | 370/462 |
| 2009/0197610 A1* | 8/2009 | Chun et al. | 455/450 |
| 2009/0280798 A1* | 11/2009 | Meylan et al. | 455/422.1 |
| 2010/0070814 A1* | 3/2010 | Damnjanovic et al. | 714/748 |
| 2010/0080185 A1* | 4/2010 | Guo | 370/329 |

FOREIGN PATENT DOCUMENTS

| | | |
|---|---|---|
| CN | 1902880 A | 1/2007 |
| CN | 1951084 A | 4/2007 |
| WO | WO 2008060077 A1 * | 5/2008 |

OTHER PUBLICATIONS

Meylan et al., U.S. Appl. No. 61/051,264, filed May 7, 2008.*
Damnjanovic et al., U.S. Appl. No. 61/093,824, filed Sep. 3, 2008.*
Chun et al., U.S. Appl. No. 61/026,119, filed Feb. 4, 2008.*
HTC Corporation, 36.321 CR for BSR Triggering with Semi-Persistent Scheduling, 33GPP TSG-RAN2 Meeting #64, R2-087205, pp. 1-3, Sep. 29-Oct. 4, 2008, XP_050321792, Prague, Czech.
3GPP, 3GPP TS 36.321 v8.3.0 MAC specification, 200809.
3GPP, 3GPP TSG-RAN2 #61bis R2-081468, 200803.
3GPP, 3GPP TSG-RAN2 #61bis R2-081598, 200803.
3GPP, 3GPP TSG-RAN2 #63bis R2-085386, 200809.
3GPP, 3GPP TSG-RAN2#63bis R2-085797, 200809.

(Continued)

*Primary Examiner* — Brian Roberts
*Assistant Examiner* — Cassandra Decker
(74) *Attorney, Agent, or Firm* — Winston Hsu; Scott Margo

(57) ABSTRACT

A method of improving uplink transmission for a MAC layer of a UE in a wireless communication system includes monitoring a transmission buffer and controlling a periodic buffer status report (BSR) timer to expire when lower priority data arrives at the transmission buffer in the condition that a periodic BSR is configured and running.

2 Claims, 12 Drawing Sheets

(56) References Cited

OTHER PUBLICATIONS

3GPP, 3GPP TS 36.331 v8.3.0 RRC specification, 200809.
Qualcomm Europe:"BSR Triggers", 5.1.1.5, Jan. 14-18, 2007, pp. 1-3, 3GPP TSG-RAN WG2 #60bis, R2-080375, XP050138229, Sevilla, Spain.
3GPP TS 36.321 V8.2.0 (May 2008), 3rd Generation Partnership Project; Technical Specification Group Radio Access Network; Evolved Universal Terrestrial Radio Access (E-UTRA)Medium Access Control (MAC) protocol specification (Release 8), pp. 1-33, XP-002554077, Sophia Antipolis Valbonne—France.
HTC corporation, 3GPP TSG-RAN WG2 #64, R2-086092, BSR Triggering with Semi-Persistent Scheduling, Nov. 10, 2008.
Office action mailed on Nov. 5, 2013 for the China application No. 201210094766.1, filing date Nov. 4, 2009, p. 1-5.

* cited by examiner

METHOD AND APPARATUS FOR IMPROVING UPLINK TRANSMISSION IN A WIRELESS COMMUNICATION SYSTEM

CROSS REFERENCE TO RELATED APPLICATIONS

This application claims the benefit of U.S. Provisional Application No. 61/110,990, filed on Nov. 4, 2008 and entitled "METHOD AND APPARATUS FOR IMPROVING SEMI-PERSISTENT SCHEDULING IN A WIRELESS COMMUNICATIONS SYSTEM", the contents of which are incorporated herein.

BACKGROUND OF THE INVENTION

1. Field of the Invention

The present invention relates to a method and related communication device in a wireless communication system for improving uplink transmission, and more particularly, to a method and related communication device for improving uplink transmission when semi-persistent scheduling resources are configured.

2. Description of the Prior Art

A long-term evolution (LTE) system, initiated by the third generation partnership project (3GPP), is now being regarded as a new radio interface and radio network architecture that provides a high data rate, low latency, packet optimization, and improved system capacity and coverage. In the LTE system, an evolved universal terrestrial radio access network (E-UTRAN) includes a plurality of base stations, called evolved Node-Bs (eNBs), and communicates with a plurality of mobile stations, also referred as user equipments (UEs). The radio protocol stacks of the E-UTRAN is given including a radio resource control layer (RRC), a packet data convergence protocol layer (PDCP), a radio link control layer (RLC), a medium access control layer (MAC), and a physical layer (PHY). In the 3GPP associated specifications, logical channels are defined as service access points between the MAC layer and the RLC layer. The MAC layer provides data transfer services on logical channels. Each logical channel type is defined by the type of information to be transferred. The RRC layer controls the scheduling of uplink (UL) data by giving each logical channel a priority.

A dynamic scheduling function is used in MAC for utilizing shared channel (SCH) resources. When sharing resources between UEs, MAC in eNB dynamically allocates physical layer resources for the downlink (DL)-SCH and UL-SCH depending on the traffic volume, the Quality of Service (QoS) requirements of each UE, and associated radio bearers. In order to utilize SCH resources more efficiently, a semi-persistent scheduling (SPS) function is introduced in the LTE system and is used in MAC, for serving upper layer applications which generates semi-static size data periodically, e.g. VoIP services.

A buffer status reporting procedure is used to provide a serving eNB with information about the amount of data in UL transmission buffers of a UE. There are three types of buffer status reports (BSRs) for different triggering events in current specification: a regular BSR, a periodic BSR, and a padding BSR, which are described later. A MAC protocol data unit consists of a MAC header, zero or more MAC service data units, zero or more MAC control elements (CEs), and optionally padding bits. BSR is one of MAC CEs, and other MAC CEs are a cell radio network temporary identifier (C-RNTI) and a power headroom report (PHR), etc. A scheduling request (SR) is used for requesting UL resources and is triggered by the regular BSR when the UE does not have an UL resource which is allocated for a current transmission time interval (TTI).

The regular BSR is triggered when UL data belonging to a logical channel with higher priority than those for which data already existed in a UE transmission buffer arrives at the UE transmission buffer. The padding BSR is triggered when UL resources are allocated and a number of padding bits is larger than a size of BSR MAC CE. The periodic BSR is optional in the LTE system, which is used to provide the eNB with updated status of the UE transmission buffer periodically. A periodic BSR timer is started when the regular BSR is triggered. When the periodic BSR timer expires, the periodic BSR is triggered and waits for an allocated UL grant to be transmitted. When the periodic BSR is transmitted, the periodic BSR timer is restarted. Once the regular BSR is triggered, the periodic BSR shall be generated periodically. Note that, the periodic BSR may be cancelled by certain events, e.g., a triggered regular BSR may cancel other existed BSRs.

Current specification defines a retransmission BSR timer "RETX BSR TIMER" for handling the situation that the UE has a transmitted BSR but the eNB does not respond with any corresponding UL resource for a long time. The retransmission BSR timer is usually much longer than a period of SPS resources. The retransmission BSR timer is started or restarted when the regular BSR is triggered or when a new UL grant is allocated. When the retransmission BSR timer expires, an enforced BSR-SR event is triggered for requesting UL resources, so that data in the transmission buffer has an opportunity to be transmitted.

Please refer to FIG. 1, which is a timing diagram illustrating uplink transmission of lower priority data according to the prior art. According to current specification, in the condition that SPS resources are configured and SPS data available for transmission in the transmission buffer is never emptied, when lower priority data belonging to a logical channel except SPS logical channels arrives at the transmission buffer, no regular BSR is triggered. As a result, the eNB does not receive information of lower priority data such that lower priority data may have no opportunity to be transmitted and simply get stalled in the buffer. Due to logical channel prioritization, stall of lower priority data happens, whether SPS resources are configured. SPS resources configuration does deteriorate this problem, however.

Note that, the original idea of the periodic BSR is to periodically report status of the UE transmission buffer to the eNB. When the periodic BSR is cancelled or is not configured, the eNB losses opportunity to periodically receive updated status of the UE transmission buffer and therefore, under the continuous presence of higher priority data as SPS data, the eNB does not find out the existence of lower priority data, and lower priority data is stalled in the transmission buffer. Besides, the retransmission BSR timer "RETX BSR TIMER" is unhelpful for requesting UL resources when SPS resources are configured because the retransmission BSR timer may be restarted periodically by arriving SPS resources and cannot expire, which results in the situation that no BSR-SR is triggered and lower priority data may be stalled forever.

Current MAC specification has a statement: "MAC control elements for BSR, with exception of padding BSR, have higher priority than U-plane logical channels." That is, the MAC CE, except the padding BSR, is of higher priority than any data radio bearer. Therefore, when generating a transport block, the UE MAC would first insert the BSR and then considers data from logical channels.

Please refer to FIG. 2, which is a timing diagram illustrating uplink transmission of SPS data and a MAC CE, e.g., a BSR, according to the prior art. FIG. 2 illustrates that for a current TTI, there are SPS data, which is assumed to have higher priority, and data from other logical channel except SPS logical channel existed in the transmission buffer; an SPS resource is allocated, which has a size equal to a size of SPS data in the transmission buffer; and a BSR is triggered. In this situation, the UE MAC inserts the BSR with a long BSR format and fills the rest of the SPS resource with SPS data. When another UL grant is allocated later, as shown in FIG. 2, the UE MAC fills the UL grant with the rest of SPS data and fills the data from other logical channel. From the above, the transmission of one SPS packet is split into two attempts, which increases the probability of retransmission and incurs extra delay.

An information element (IE) "MAC-MainConfiguration" is used to specify the transport channel configuration for data radio bearers, including periods of SPS resources and periods of periodic MAC CEs, such as the periodic BSR and a periodic PHR. In the IE "MAC-MainConfiguration", a period of a periodic MAC CE is set by a periodic MAC CE timer, and some periods of the periodic MAC CEs are not larger than the period of SPS resources. For example, when a periodic MAC CE timer is 5 second, which is not larger than 10 second as the period of SPS resources, the periodic MAC CE timer always expires before an allocated SPS UL resource. Furthermore, when the allocated SPS resource is not large enough for transmitting SPS data plus the periodic MAC CE, once the periodic MAC CE is inserted at the SPS resource, subsequent insertion at every SPS resource happens inevitably. Please refer to FIG. 3, which is a timing diagram illustrating uplink transmission of SPS data and periodic BSRs according to the prior art. The split behavior may happen periodically until the eNB modifies SPS resources, or even in the rest span of the configured SPS resources.

SUMMARY OF THE INVENTION

The present invention therefore provides a method and related communication device for improving uplink transmission for a MAC layer of a UE in a wireless communication system.

The present invention discloses a method of improving uplink transmission for a MAC layer of a UE in a wireless communication system. The method includes monitoring a transmission buffer and controlling a periodic BSR timer to expire when lower priority data arrives at the transmission buffer in the condition that a periodic BSR is configured and running.

The present invention further discloses a communication device of a wireless communication system for improving uplink transmission. The communication device includes a computer readable recording medium, for storing program code corresponding to a process, and a processor that is coupled to the computer readable recording medium and is used for processing the program code to execute the process. The process includes monitoring a transmission buffer and controlling a periodic BSR timer to expire when lower priority data arrives at the transmission buffer in the condition that a periodic BSR is configured and running.

The present invention further discloses a method of improving uplink transmission for a MAC layer of a UE in a wireless communication system. The method includes keeping a periodic BSR running when the periodic BSR is configured.

The present invention further discloses a method of improving uplink transmission for a MAC layer of a UE in a wireless communication system. The method includes starting a retransmission BSR timer and prohibiting restarting the retransmission BSR timer by an SPS resource when SPS resources are configured.

The present invention further discloses a method of improving uplink transmission when SPS resources are configured for a MAC layer of a UE in a wireless communication system. The method includes configuring a periodic MAC control element timer and setting the periodic MAC control element timer to a value larger than a period of SPS resources.

The present invention further discloses a method of improving uplink transmission when SPS resources are configured for a MAC layer of a UE in a wireless communication system. The method includes forbidding transmitting a periodic MAC control element in an SPS resource.

The present invention further discloses a method of improving uplink transmission when SPS resources are configured for a MAC layer of a UE in a wireless communication system, the UE having ability to differentiate SPS data from non-SPS data. The method includes receiving SPS data and assigning a higher priority for SPS data than for MAC control elements.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
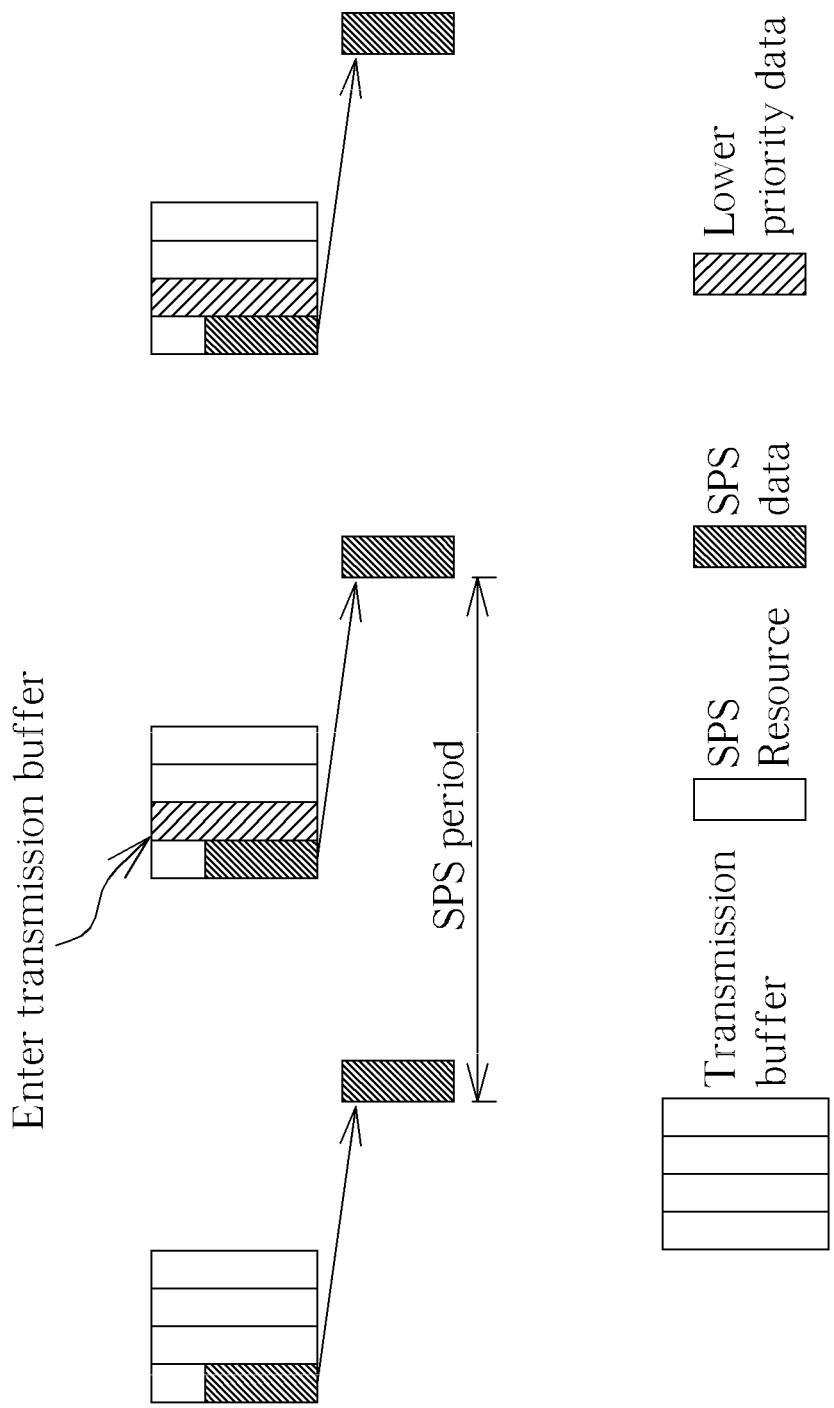
FIG. 1 is a timing diagram illustrating uplink transmission of lower priority data according to the prior art.
Figure 2:
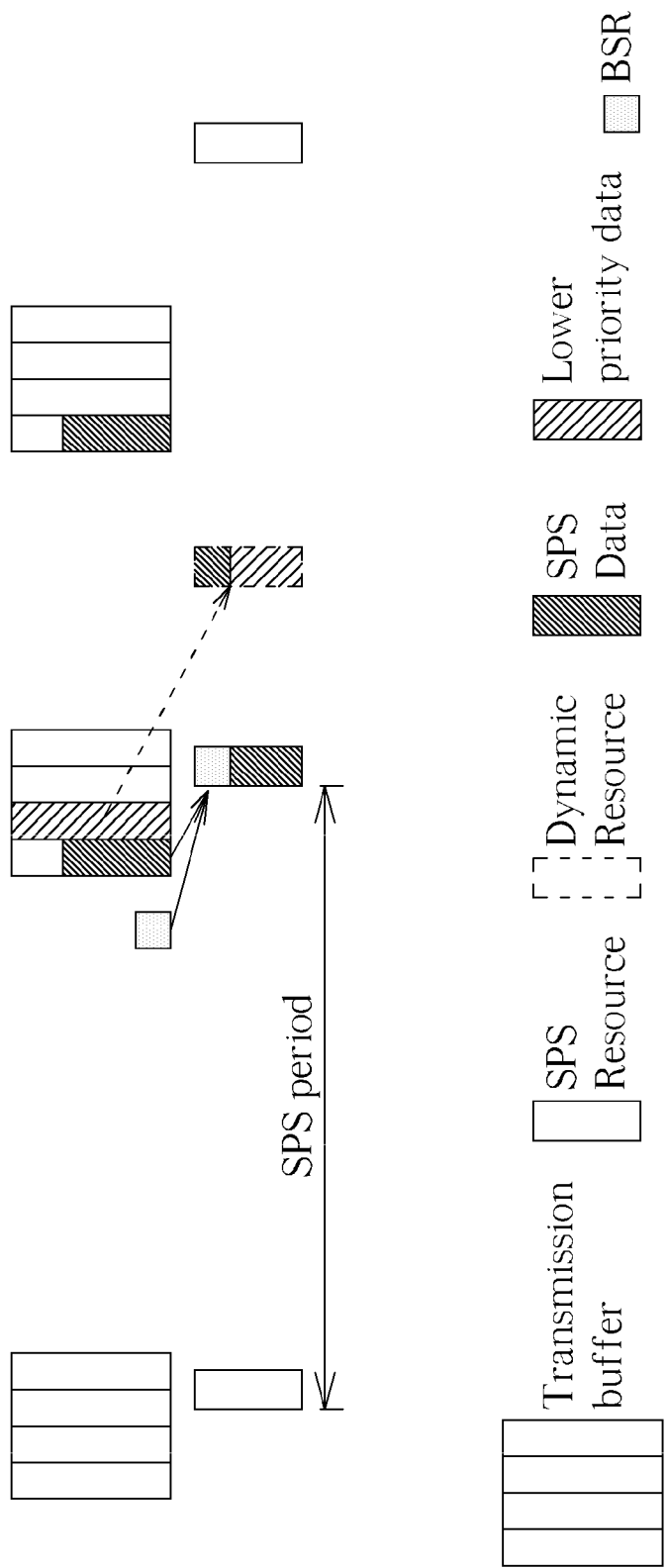
FIG. 2 is a timing diagram illustrating uplink transmission of SPS data and a BSR according to the prior art.
Figure 3:
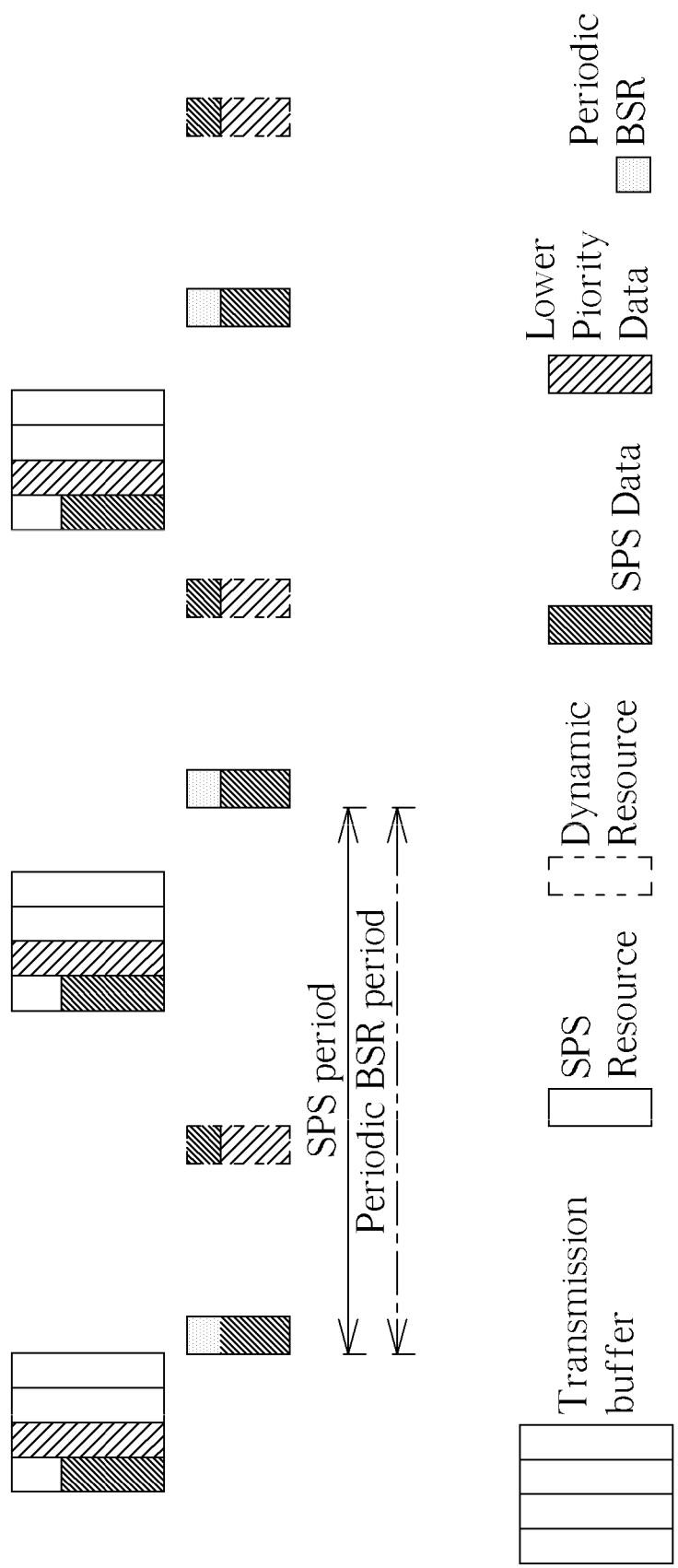
FIG. 3 is a timing diagram illustrating uplink transmission of SPS data and periodic BSRs according to the prior art.
Figure 4:
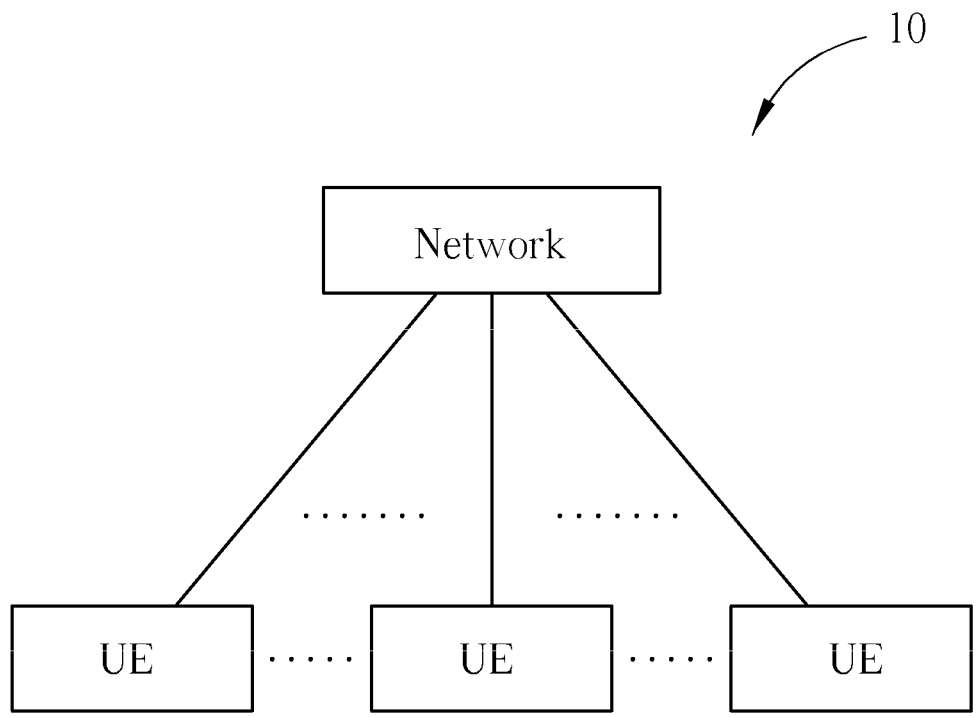
FIG. 4 is a schematic diagram of a wireless communication system.

Please refer to FIG. 4, which is a schematic diagram of a wireless communication system 10 according to an example of the present invention. The wireless communication system 10 can a long-term evolution (LTE) system or other mobile communication systems, and is briefly composed of a network and a plurality of user equipments (UEs), as the structure illustrated in FIG. 4. In the LTE system, the network is referred as an evolved universal terrestrial radio access network (E-UTRAN) comprising a plurality of evolved base stations (eNBs). The UEs can be devices such as mobile phones, computer systems, etc. Besides, the network and the UE can be seen as a transmitter or receiver according to transmission direction, e.g., for uplink, the UE is the transmitter and the network is the receiver, and for downlink, the network is the transmitter and the UE is the receiver.

Figure 5:
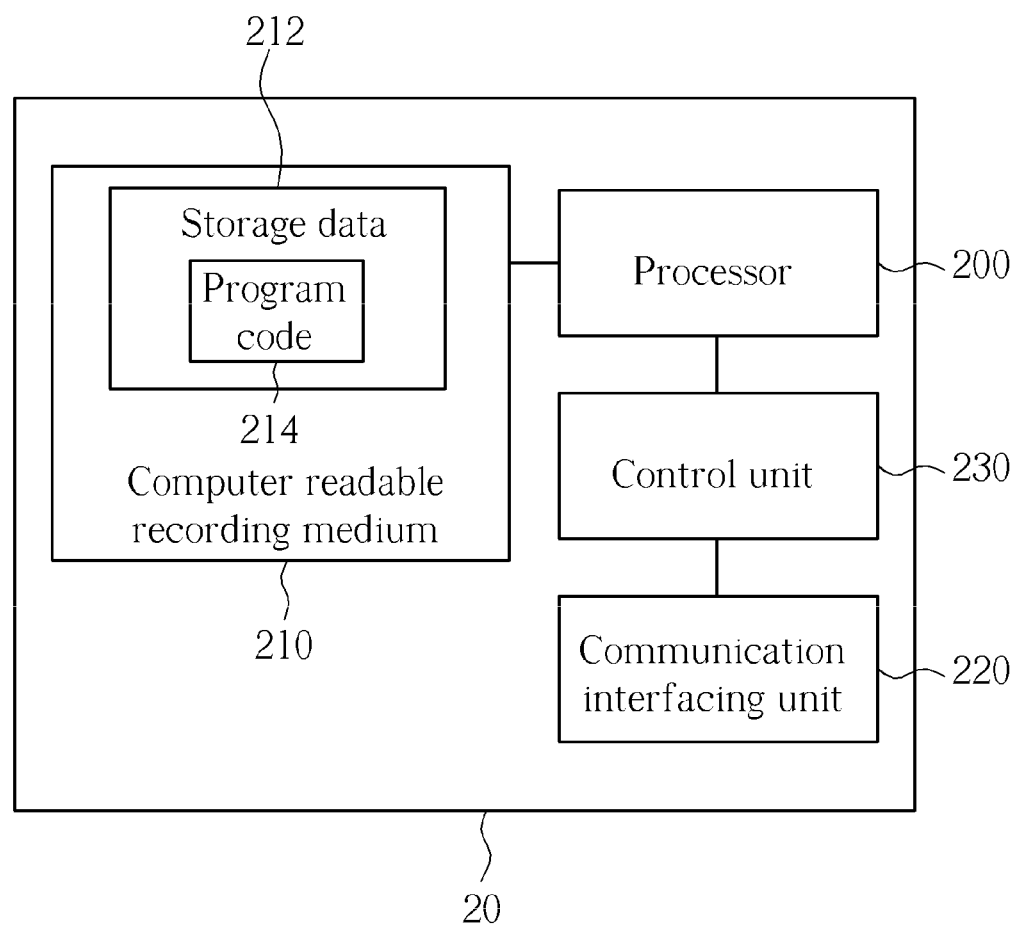
FIG. 5 is a schematic diagram of a communication device according to an example of the present invention.

Please refer to FIG. 5, which is a schematic diagram of a communication device 20 according to an example of the present invention. The communication device 20 can be the UE shown in FIG. 5 and includes a processor 200, a computer readable recording medium 210, a communication interfacing unit 220 and a control unit 230. The computer readable recording medium 210 is any data storage device that stores storage data 212, including program code 214, thereafter read and processed by the processor 200. Examples of the computer readable recording medium 210 include a subscriber identity module (SIM), read-only memory (ROM), random-access memory (RAM), CD-ROMs, magnetic tapes, floppy disks, optical data storage devices, and carrier waves (such as data transmission through the Internet). The control unit 230 controls the communication interfacing unit 220 and related operations and states of the communication device 20 according to processing results of the process 200. The communication interfacing unit 220 is preferably a radio transceiver for wirelessly communicating with the network.

Figure 6:
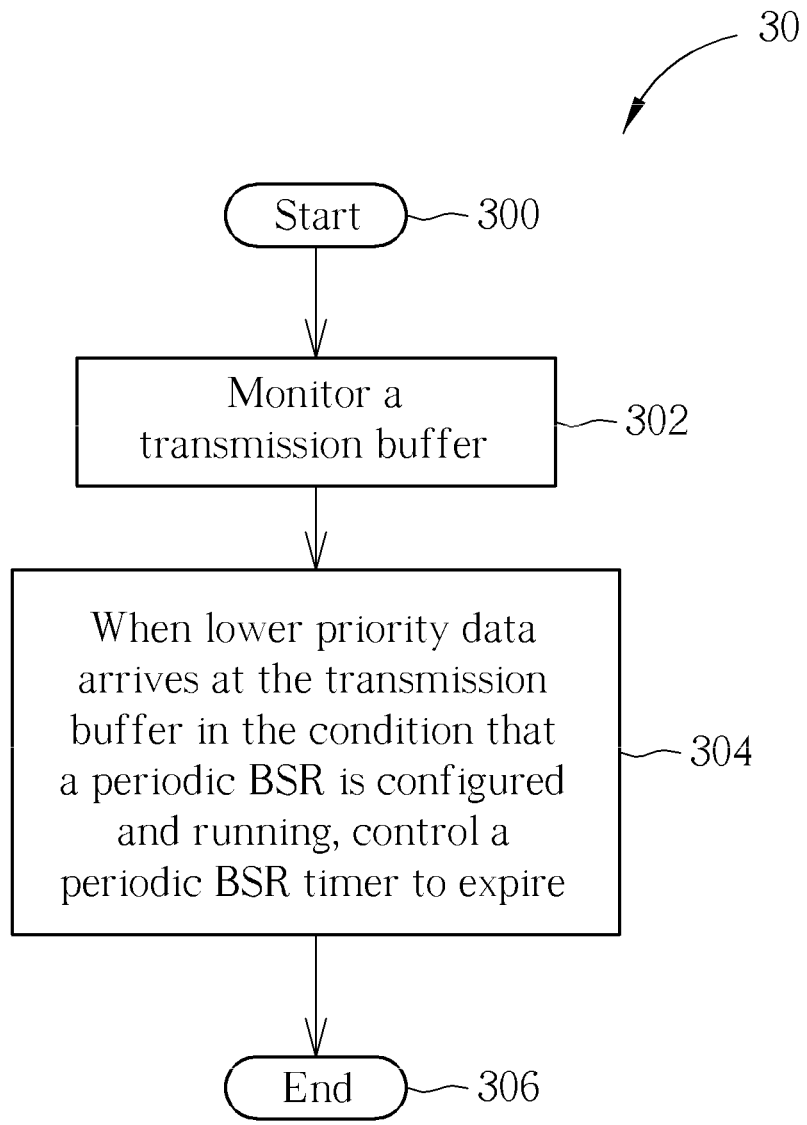
FIG. 6 to FIG. 11 are flowcharts of processes according to examples of the present invention.

As mentioned previously, stall of lower priority data may happens and becomes more serious when semi-persistent scheduling (SPS) resources are configured. The present invention uses the periodic buffer status report (BSR) timer to solve the problem of stall of lower priority data. Please refer to FIG. 6, which is a flowchart of a process 30 according to an example of the present invention. The process 30 is utilized for improving uplink (UL) transmission for a medium access control (MAC) layer of a UE in the wireless communication system 10. The process 30 can be compiled into the program code 214, which includes the following steps:

Step 300: Start.
Step 302: Monitor a transmission buffer.
Step 304: When lower priority data arrives at the transmission buffer in the condition that a periodic BSR is configured and running, control a periodic BSR timer to expire.
Step 306: End.

According to the process 30, the UE monitors an UL transmission buffer and when lower priority data arrives at the transmission buffer in the condition that a periodic BSR is configured and running, the UE controls a periodic BSR timer to expire, so that the periodic BSR is triggered and waits to be transmitted for reporting status of the transmission buffer. Thus, when an UL grant arrives, the periodic BSR can be transmitted and the eNB can receive updated status of the transmission buffer.

In the prior art, no regular BSR is triggered when lower priority data enters the transmission buffer such that lower priority data is simply stalled in the transmission buffer. Through the process 30, the periodic BSR is triggered when lower priority data enters the transmission buffer. After the periodic BSR is transmitted, the eNB receives status of the transmission buffer and allocates an UL grant for lower priority data transmission. Therefore, stall of lower priority data is solved.

Figure 7:
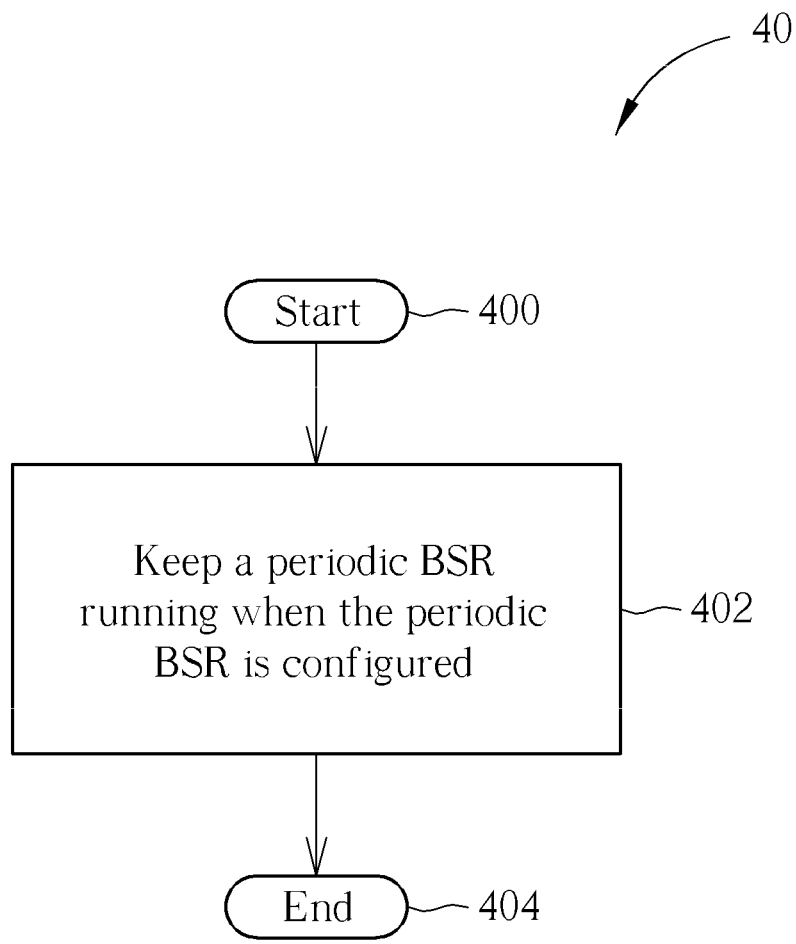

According to current specification, after the periodic BSR is configured, the periodic BSR may be cancelled or stopped by certain events such that lower priority data has no chance to be transmitted through the assistance of the periodic BSR. Please refer to FIG. 7, which is a flowchart of a process 40 according to an example of the present invention. The process 40 is utilized for improving UL transmission for the MAC layer of the UE. The process 40 can be compiled into the program code 214, which includes the following steps:

Step 400: Start.
Step 402: Keep a periodic BSR running when the periodic BSR is configured.
Step 404: End.

Compared with the prior art that the periodic BSR may be cancelled or stopped, according to the process 40, the UE keeps the periodic BSR running when the periodic BSR is configured. In other words, the periodic BSR is not cancelled nor stopped by any event when the periodic BSR is configured. Therefore, the eNB has opportunities to receive the periodic BSR that includes updated status of the UE transmission buffer and accordingly, assigns UL grants for lower priority data transmission.

Figure 8:
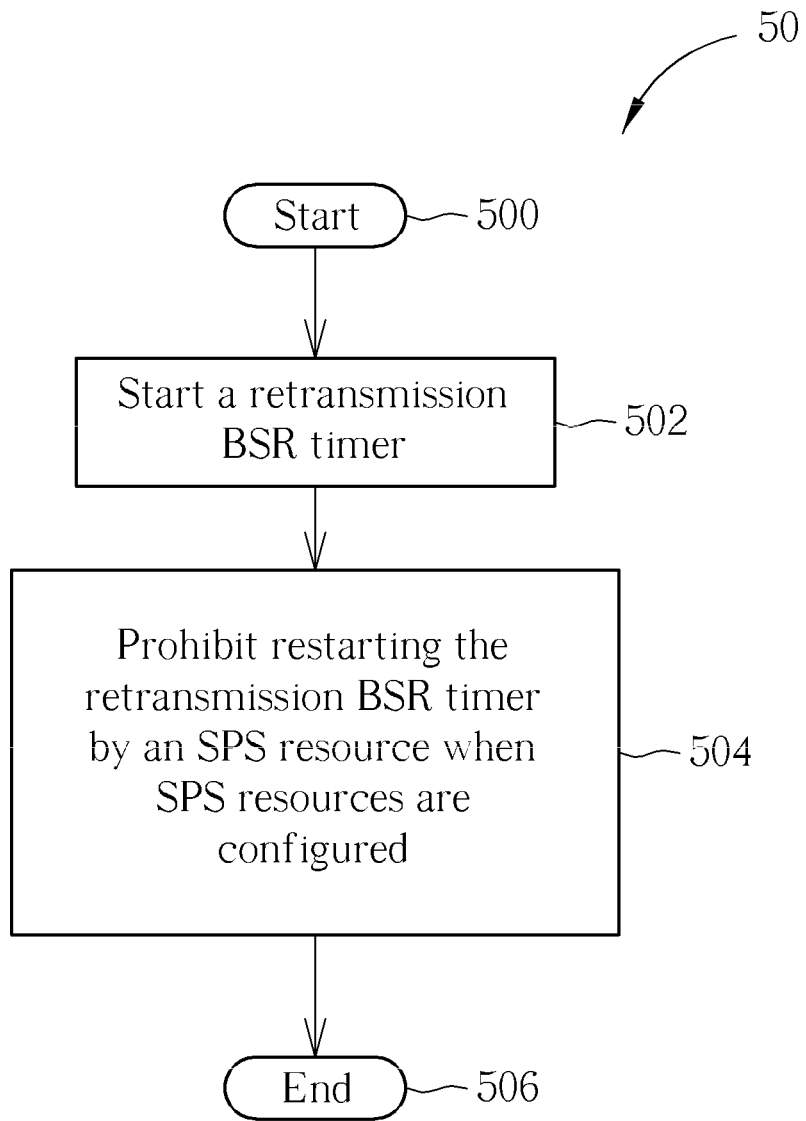

In the process 30 and the process 40, the present invention uses the periodic BSR to solve the stall of lower priority data. The present invention further provides another way to trigger a BSR without using the periodic BSR. Please refer to FIG. 8, which is a flowchart of a process 50 according to an example of the present invention. The process 50 is utilized or improving UL transmission for the MAC layer of the UE. The process 50 can be compiled into the program code 214, which includes the following steps:

Step 500: Start.
Step 502: Start a retransmission BSR timer.
Step 504: Prohibit restarting the retransmission BSR timer by an SPS resource when SPS resources are configured.
Step 506: End.

According to the process 50, the UE starts a retransmission BSR timer "RETX BSR TIEMR", which is used for handling the situation that the UE has a transmitted BSR but the eNB does not respond with any corresponding UL resource for a long time. After the UE starts a retransmission BSR timer "RETX BSR TIEMR", the UE prohibits restarting the retransmission BSR by an SPS resource when SPS resources are configured. In other words, the UE does not restart the retransmission BSR timer by SPS resources when SPS resources are configured. Therefore, the retransmission BSR timer can expire normally, which triggers a BSR-SR to request UL resources for lower priority data transmission. Compared with the prior art in which the retransmission BSR timer may be restarted periodically by arriving SPS resources and cannot expire, the present invention improves the operation of the retransmission BSR timer, so that the eNB can receive the BSR and therefore lower priority data has a chance to be transmitted.

Figure 9:
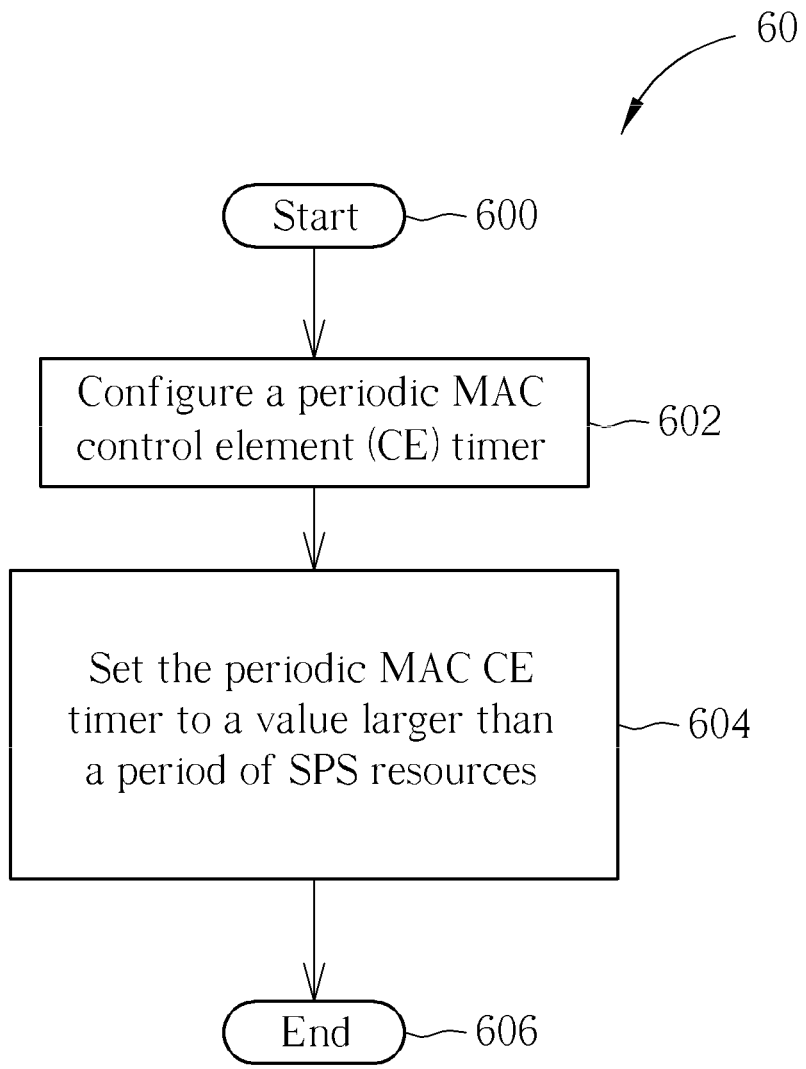

Please note that, current specification does not clearly specify whether the UE can differentiate between SPS data and non-SPS data. The present invention provides two examples, a process 60 and a process 70, by which the UE doe not require differentiating between SPS data and non-SPS data and can improve the SPS data split behavior. Please refer to FIG. 9, which is a flowchart of the process 60 according to an example of the present invention. The process 60 is utilized for improving UL transmission when SPS resources are configured for the MAC layer of the UE. The process 60 can be compiled into the program code 214, which includes the following steps:

Step 600: Start.
Step 602: Configure a periodic MAC control element (CE) timer.
Step 604: Set the periodic MAC CE timer to a value larger than a period of SPS resources.
Step 606: End.

The periodic MAC CE timer in the process 60 is the periodic BSR timer or a periodic power headroom (PHR) timer, which is defined in an information element "MAC-MainConfiguration" used for specifying the transport channel configuration for data radio bearers. In the prior art, when the periodic MAC CE timer is not larger than the period of SPS resources, the periodic MAC CE timer always expires and triggers a periodic MAC CE before the allocated SPS UL resource such that periodic MAC CE insertion happens frequently, which results in SPS data split when generating the transport block. Relatively, according to the process 60, after the periodic MAC CE timer is configured, the UE sets the periodic MAC CE timer to a value larger than the period of SPS resources and therefore the occurrence of SPS data split decreases.

Figure 10:
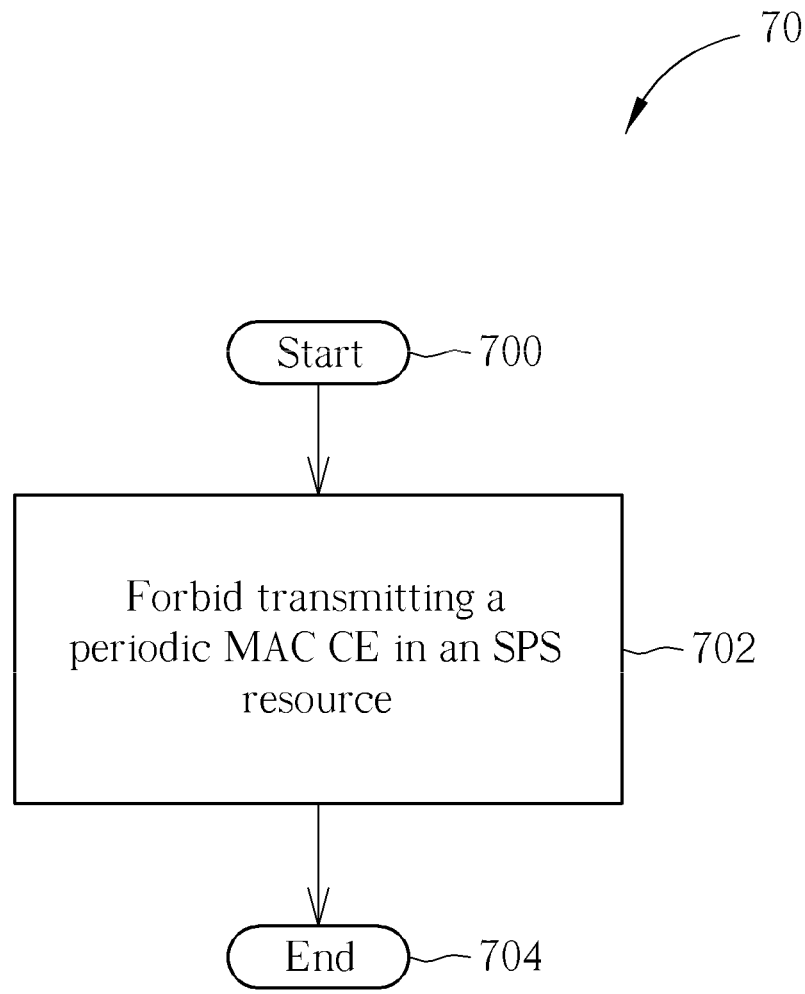

Please refer to FIG. 10, which is a flowchart of the process 70 according to an example of the present invention. The process 70 is utilized for improving UL transmission when SPS resources are configured for the MAC layer of the UE. The process 70 can be compiled into the program code 214, which includes the following steps:

Step 700: Start.

Step 702: Forbid transmitting a periodic MAC CE in an SPS resource.

Step 704: End.

The periodic MAC CE in the process 70 is the periodic BSR or the periodic PHR. In the prior art, once the periodic MAC CE is inserted at an SPS resource, subsequent insertion happens at every SPS resource because the periodic MAC CE has a higher priority than any data radio bearer. In comparison, according to the process 70, the UE simply forbids transmitting the periodic MAC CE in SPS resources. In other words, the periodic MAC CE can only be transmitted in dynamic scheduling UL grants. Therefore, unnecessary SPS data split does not take place.

Figure 11:
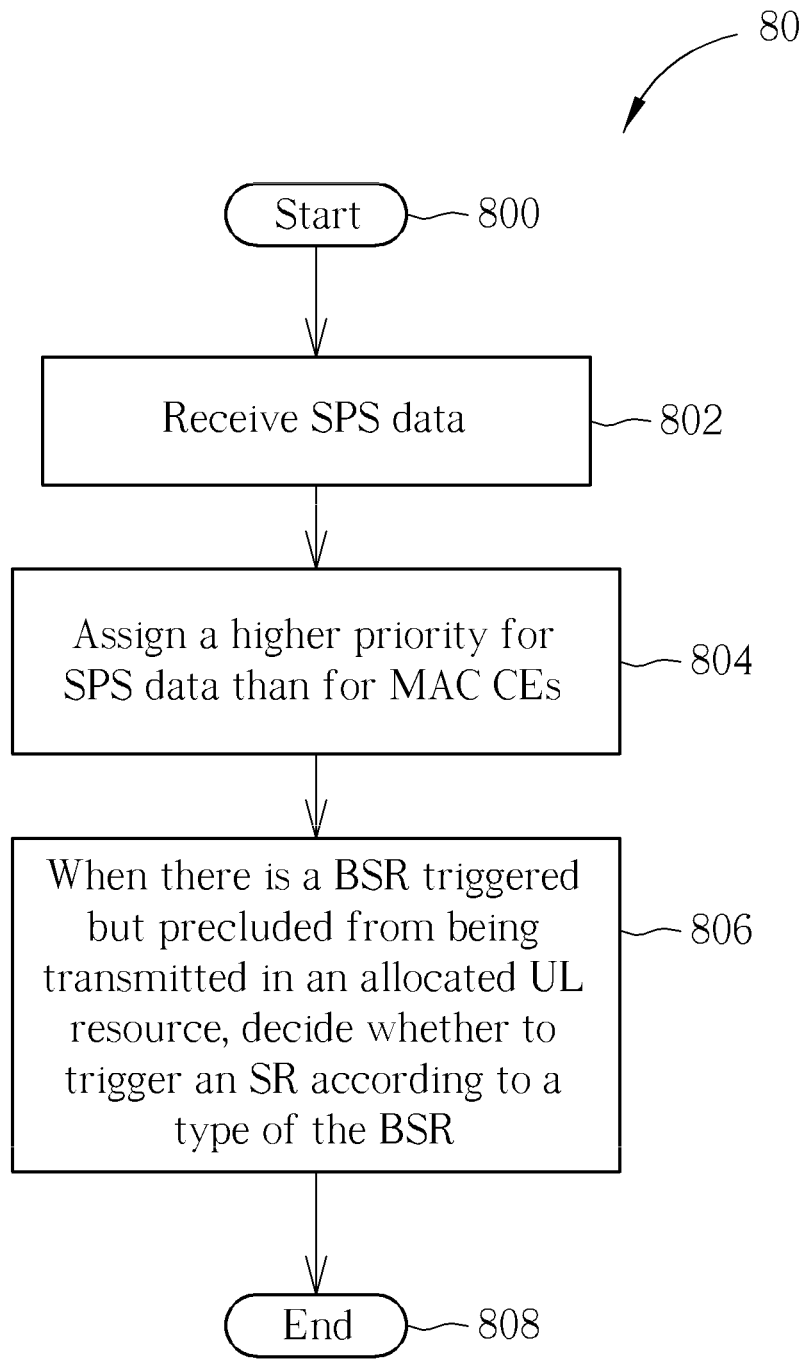

In addition, the present invention further provides a process based on that the UE can differentiate between SPS data and non-SPS data, usually supported by RRC. Please refer to FIG. 11, which is a flowchart of the process 80 according to an example of the present invention. The process 80 is utilized for improving UL transmission when SPS resources are configured for the MAC layer of the UE. The process 80 can be compiled into the program code 214, which includes the following steps:

Step 800: Start.

Step 802: Receive SPS data.

Step 804: Assign a higher priority for SPS data than for MAC CEs.

Step 806: When there is a BSR triggered but precluded from being transmitted in an allocated UL resource, decide whether to trigger a scheduling request (SR) according to a type of the BSR.

Step 808: End.

According to the process 80, after receiving SPS data from a higher layer, the UE assigns a higher priority for SPS data than for MAC CEs, e.g., periodic BSR or periodic PHR. Note that, the UE MAC places data from the logical channel with a higher priority first into an UL resource. Through the priority assignment, SPS data is placed into an allocated SPS UL resource first and then MAC CEs are considered, so that the MAC CEs does not result in unnecessary SPS data split.

Moreover, when there is a BSR triggered but precluded from being transmitted in an allocated UL resource, the UE decides to trigger or not to trigger an SR according to a type of the triggered BSR. When the type of the BSR is a regular BSR, which means that the allocated UL resource is really not enough, the UE triggers the SR to request UL resources. When the type of the BSR is not a regular BSR, which means that the BSR may be a periodic BSR or a padding BSR that is not as necessary as the regular BSR, the UE does not trigger the SR and leaves the BSR pending. Through the process 80, unnecessary SPS data split behavior is avoided.

Figure 12:
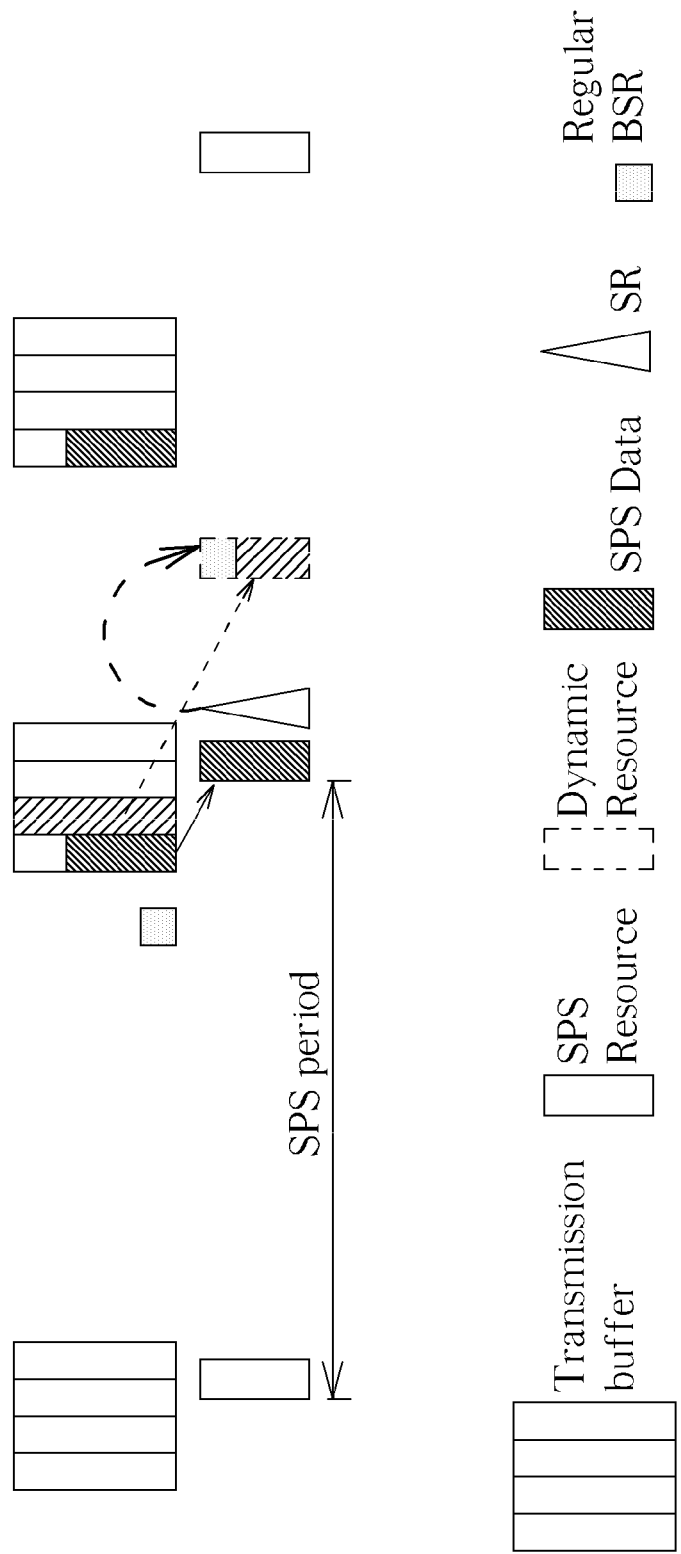
FIG. 12 is a timing diagram illustrating uplink transmission of SPS data and a MAC control element according to the process in FIG. 11.

Please refer to FIG. 12, which is a timing diagram illustrating uplink transmission of SPS data and a MAC CE according to the process 80. As shown in FIG. 12, there are SPS data and non-SPS data in the UE transmission buffer. A size of an allocated SPS resource is equal to the size of SPS data in the transmission buffer. At the same time, there is a regular BSR triggered. According to the process 80, SPS data is completely transmitted and the regular BSR and non-SPS data are left. Therefore, SPS data is not split. Also, the UE triggers an SR to request an UL resource. After the UL resource arrives, the regular BSR and non-SPS data are transmitted.

In conclusion, the present invention solves the problem of stall of lower priority data by using the periodic BSR or using the retransmission BSR timer. The present invention also solves the problem of SPS data split transmission, so that quality of VoIP service is enhanced. Therefore, uplink transmission of the UE is greatly improved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of improving uplink transmission when semi-persistent scheduling (SPS) resources are configured for a medium access control (MAC) layer of a user equipment in a wireless communication system, the method comprising:
   forbidding transmitting a periodic MAC control element in any SPS resource;
   transmitting the periodic MAC control element only in non-SPS resources.

2. The method of claim 1, wherein the periodic MAC control element is a periodic buffer status report (BSR) or periodic power headroom report (PHR).

* * * * *